United States Patent [19]

Sato

[11] Patent Number: 4,543,618
[45] Date of Patent: Sep. 24, 1985

[54] TAPE RECORDER

[75] Inventor: Masaaki Sato, Tokyo, Japan

[73] Assignee: Olympus Optical Company Limited, Tokyo, Japan

[21] Appl. No.: 421,399

[22] Filed: Sep. 22, 1982

[30] Foreign Application Priority Data

Sep. 24, 1981 [JP] Japan .................. 56-150882
Sep. 24, 1981 [JP] Japan .................. 56-150883

[51] Int. Cl.⁴ .................. G11B 5/86; G11B 15/12
[52] U.S. Cl. .................. 360/15; 360/62; 360/63
[58] Field of Search .................. 360/13, 15, 61, 62, 360/63

[56] References Cited

U.S. PATENT DOCUMENTS

| 4,122,500 | 10/1978 | Bradford et al. | 360/13 |
| 4,249,218 | 2/1981 | Davis et al. | 360/13 |
| 4,280,152 | 7/1981 | Silver | 360/61 |
| 4,357,636 | 11/1982 | Takeromi et al. | 360/61 |
| 4,363,049 | 12/1982 | Ohrsuki et al. | 360/13 |

Primary Examiner—Vincent P. Canney
Attorney, Agent, or Firm—Toren, McGeady, Stanger, Goldberg & Kiel

[57] ABSTRACT

A tape recorder capable of performing simultaneous recording or reproducing operation and dubbing operation easy is disclosed. The tape recorder comprises a dubbing means for simultaneously operating a reproducing operation means for one tape drive mechanism and a recording and reproducing operation means for the other drive mechanism or an operation interlock means for simultaneously operating a pair of pause operating means.

14 Claims, 15 Drawing Figures 4,543,618

TAPE RECORDER

BACKGROUND OF THE INVENTION

The present invention relates to a tape recorder capable of performing a dubbing operation, or duplication of other tape drive mechanisms, with a one-touch action and simultaneously recording and reproducing with several tape drive mechanisms.

Hitherto dubbing a master tape has involved electrically connecting a first tape recorder and a second tape recorder with a cord, loading the master tape on the first tape recorder, loading an unrecorded magnetic tape on the second tape recorder, reproducing with the first tape recorder and recording with the second tape recorder.

This dubbing system requires two tape recorders so that it is expensive, large and heavy and thus inconvenient.

An arrangement to eliminate these disadvantages is shown in FIG. 1 where a double cassette tape recorder forms a cassette loading or receiving chamber having two tape drive mechanisms in the one tape recorder. In FIG. 1, a tape recorder body or housing 1 has a front surface with a pair of cassette loading or receiving chambers 2 and 3 and mode change sections 4 and 5 for changing various operating modes in each cassette receiving chamber 2 or 3. The mode change sections 4 and 5 include mechanical push button switches 4a-4f and 5a-5f in a line for performing, for example, recording, reproducing, stop rewind, fast forward, and pause operations as shown in FIG. 1 from the left.

The front surface of the housing 1, also holds line level adjusting volume control knobs 6 and 7 and microphone level adjusting volume control knobs 8 and 9 which are positioned on the left side of the cassette receiving chamber 2, and a level indicator 10 for displaying the recording level of left and right lines, a reproducing level adjusting volume control knob 11, microphone jacks 12, 13 and a head-phone jack 14 which are positioned to the right of the cassette receiving chamber 3.

Performing a dubbing operation with such a tape recorder involves first loading a master tape in the cassette chamber 2 and then loading an unrecorded magnetic tape in the cassette chamber 3. In this condition an operator simultaneously pushes the reproducing operation push button switch 4b of the cassette chamber 2 and the recording operation push button switch 5a and the reproducing operation push button switch 5b of the cassette chamber 3.

A time lag arises from the pushing action of the switches 4b, 5a and 5b and results in an unwanted recording. For example, when the switch 4b is pushed faster than the switches 5a and 5b the master tape starts to rotate before the unrecorded tape starts to record so that the initial portion of the master tape may not be recorded. In the case of a microcassette particularly, both ends of the magnetic tape are directly fixed to respective hubs of the cassette, so that the entire tape from the initial portion to the end is used for recording. The lag of the recording operation therefore, causes an unrecorded initial portion and an interruption of the recording at the end because the take up of the magnetic tape stops before the recording is fully completed. The switches 4b, 5a and 5b must also be actuated separately so that the operation of the tape recorder becomes complicated.

The same problem arises in a double cassette tape recorder using a logic control switch as the mode change arrangements 21, 22 shown in FIG. 2 in which the other portions of the tape recorder except for arrangements 21, 22 are the same as that of FIG. 1 so that like reference numerals designate like or functionally equivalent parts.

SUMMARY OF THE INVENTION

It is an object of the present invention to eliminate the above described disadvantages of conventional tape recorders.

It is another object of the present invention to provide a tape recorder in which at least recording and reproducing operation means are provided in a tape recorder housing having a pair of tape drive mechanisms in accordance with each tape drive mechanism, and a dubbing means is provided for simultaneously actuating reproducing operation means of the drive mechanism and recording operation means and reproducing operation means of the other tape drive mechanism, thereby making the dubbing action easy.

It is a further object of the present invention to provide a tape recorder in which mode change operation means is provided to a tape recorder having a pair of tape drive mechanisms in accordance with each tape drive mechanism and an operation interlock means is provided for simultaneously actuating a pair of pause operation mechanisms to control temporary OFF condition of recording and reproducing operation caused by the mode change operation means, thereby making a synchronous or simultaneous recording and reproducing operation and dubbing operation easy.

According to the present invention there is provided a tape recorder body or housing, a pair of tape drive mechanisms provided in the body, mode change operation means provided for the tape drive mechanisms for performing at least recording or reproducing, and a dubbing means for simultaneously operating a reproducing operation means for one tape drive mechanism and a recording and operation means for other tape drive mechanism. The mode change operation means comprises a logic control switch. The mode change operation means comprises a mechanical push button switch. The dubbing means comprises a first logic control switch for performing a recording and reproducing operation for one tape drive mechanism, a second logic control switch for performing a reproducing operation of the other tape drive mechanism, and a third logic control switch for performing a reproducing operation of the other tape drive mechanism, these switches being positioned so that they are capable of operating at one time. The dubbing means comprises a remote control drive for controlling the ON and OFF operations of the first and the second logic control switches. The dubbing means comprises an actuation lever interlocked to a first push button for performing a reproducing operation of one tape drive mechanism, and to a second push button for performing a recording and a reproducing operation of the other tape drive mechanism simultaneously.

According to the present invention there is provided a tape recorder comprising a tape recorder body, a pair of tape drive mechanisms provided to the body, mode change operation means provided to the tape drive mechanisms for performing at least recording or reproducing, a pair of pause operation means for temporarily controlling OFF condition of recording or reproducing operationcaused by the mode change operation means, and an operation interlock means for simultaneously operating the pair of pause operation means. The operation interlock means is provided closely so as to drive the pair of pause operation means at one time. The operation interlock means comprises operation buttons for simultaneously operating the pair of pause operation means. The operation interlock means comprise an actuation lever for driving the pause operation means of one tape drive mechanism and the pause operation means of the other tape drive mechanism.

DESCRIPTION OF THE PREFERRED EMBODIMENTS

Figure 3:
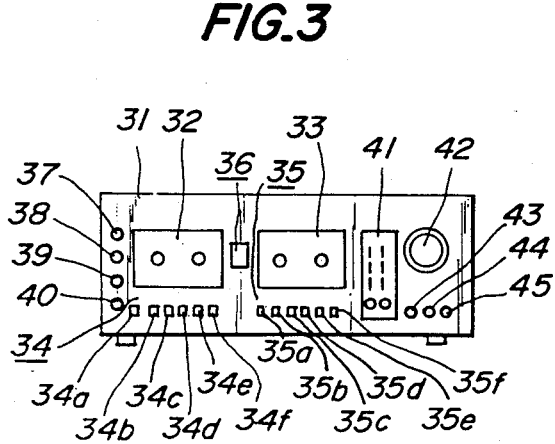
FIG. 3 is a front view showing a first embodiment of a tape recorder according to the present invention.
Figure 4:
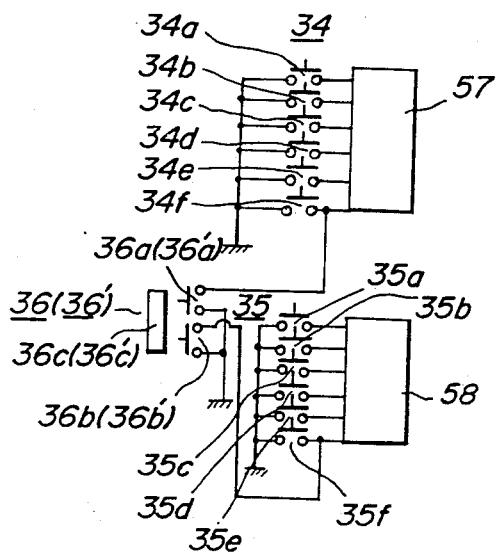
FIG. 4 is a circuit diagram explaining a pause operation interlock means.
Figure 5:
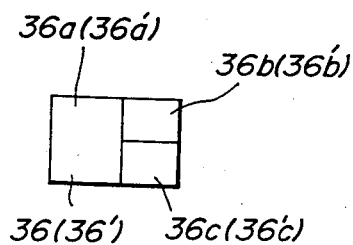
FIG. 5 is a front view illustrating a dubbing operation means shown in FIG. 3.

The drawings show an embodiment of a tape recorder according to the present invention. FIG. 3 shows an embodiment in which the present invention is applied to a C cassette tape recorder. In FIG. 3 reference numeral 31 is a cassette tape recorder body or housing, the front side of which holds cassette loading or receiving chambers 32 and 33 forming parts of tape drive mechanisms. The chambers 32 and 33 are adjacent mode change operation means or devices 34 and 35 for actuating at least recording and reproducing operations. The mode change devices 34 and 35 are constructed of logic control switches such as feather touch switches for changing modes through large scale integrated circuits (hereinafter referred to as LSI's) 57 and 58 for controlling ON.OFF conditions of various operation mode circuits as shown in FIG. 4. The devices 34 and 35 are constructed of recording operation feather touch switches 34a, 35a, reproducing operation feather touch switches 34b, 35b, stop operation feather touch switches 34c, 35c rewind operation feather touch switches 34d, 35d, fast forward operation feather touch switches 34e, 35e, and pause operation feather touch switches 34f, 35f, which are placed in a row under the cassette chambers 32 and 33. According to the present invention a dubbing means or arrangement for actuating the switch 34b of the cassette chamber 32 and the switches 35a and 35b of the cassette chamber 33, simultaneously. In this embodiment, as shown in FIG. 5 the dubbing arrangement is constructed of a dubbing system 36 composed of an auxiliary play or reproducing (PLAY) operation feather touch switch 36a connected parallel to the switch 34b, an auxiliary recording (REC) operation feather touch switch 36b connected parallel to the switch 35a, and an auxiliaryplay (PLAY) operation feather touch switch 36c connected parallel to the switch 35b. These switches are positioned as close as possible to actuate at one time. The dubbing operation section 36 is positioned between a pair of cassette chambers 32 and 33.

The front surface of the housing 31 carries line level adjusting volume control knobs 37, 38 and microphone level adjusting volume control knobs 39, 40 which are placed in a column on the left side of the cassette chamber 32, and a level indicator 41 for displaying recording level of left and right lines, a reproducing level adjusting volume knob 42, microphone jacks 43, 44 and a headphone jack 45 which are positioned on the right side of the cassette chamber 33.

Figure 1:
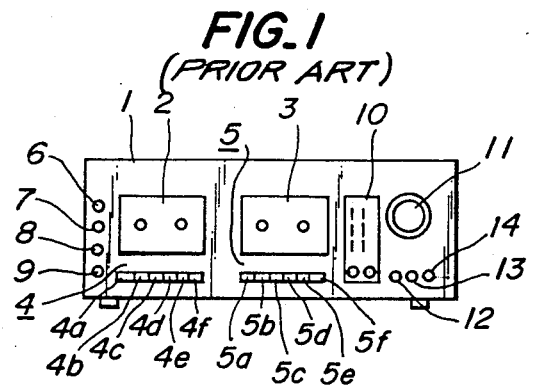
FIGS. 1 and 2 are front views showing construction of conventional tape recorder.
Figure 2:
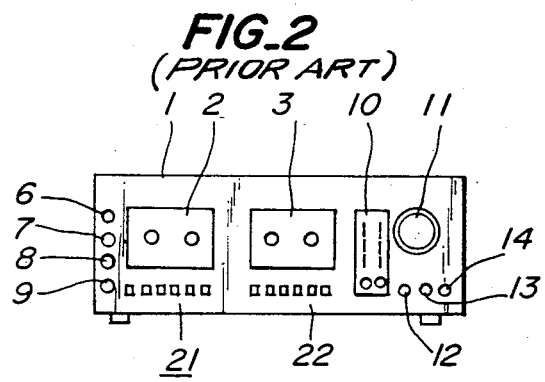

The operation of the tape recorder according to the present invention is as follows. The operation of the mode change mechanism is the same as that shown in FIG. 1 so that its explanation is omitted. In the dubbing operation section 36, when the center portion of the section 36 is pushed on after a master tape is loaded in the cassette chamber 32 and an unrecorded magnetic tape is loaded on the cassette chamber 33, the switches 36a, 36b and 36c are pushed on, simultaneously, so that the master tape is reproduced in response to the switch 36a and the unrecorded tape starts being recorded in response to the switches 36b and 36c.

As described above the switches 36a, 36b and 36c are placed as close as possible to be actuated at one time so that the dubbing operation can easily be carried out merely by pushing center portion of switches 36a, 36b and 36c and thus the master tape and the unrecorded tape can be started. This results in preventing an unrecorded initial portion and an interrupted final portion of the tape.

Figure 6:
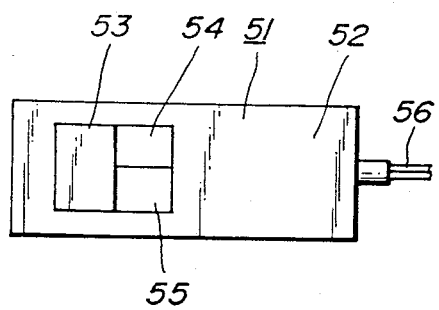
FIGS. 6 and 7 are front views showing dubbing operation remote control device and operation push button of second and third embodiments.

FIG. 6 shows a dubbing operation remote control device 51 to be connected to a remote control jack (not shown) of a double cassette tape recorder shown in FIG. 3 to remote control the reproduction of the cassette chamber 32 and the recording of the cassette chamber 33. The device 51 comprises a frame body or frame 52, an auxiliary playing or reproducing operation feather touch switch 53 connected parallel to the switch 34b, an auxiliary recording operation feather touch switch 54 parallel connected to the switch 35a and an auxiliary reproducing operation feather touch switch 55 connected parallel to the switch 35b, all of which are placed as close as possible to actuate at one time as shown in FIG. 5. Reference numeral 56 represents a remote control cord for electrically connecting the device 51 to a remote control jack of the tape recorder body 31.

The device 51 constructed by this embodiment can obtain the same effect as that produced by the previous embodiment.

Figure 7:
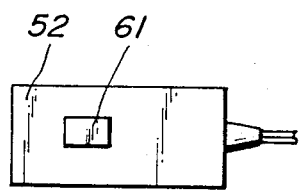

Alternatively, as shown in FIG. 7, an operation push button 61 for pushing on the switches 53, 54 and 55 at a time can be provided to the frame 52.

In this case one push button 61 may actuate switches 53, 54, and 55 simultaneously so that a reliable dubbing operation can be obtained.

Figure 8:
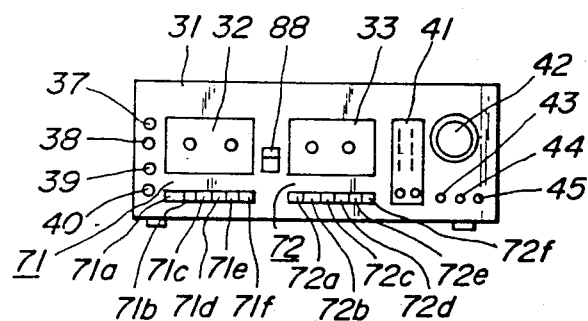
FIG. 8 is a front view showing fourth embodiment of the tape recorder according to the present invention.
Figure 9:
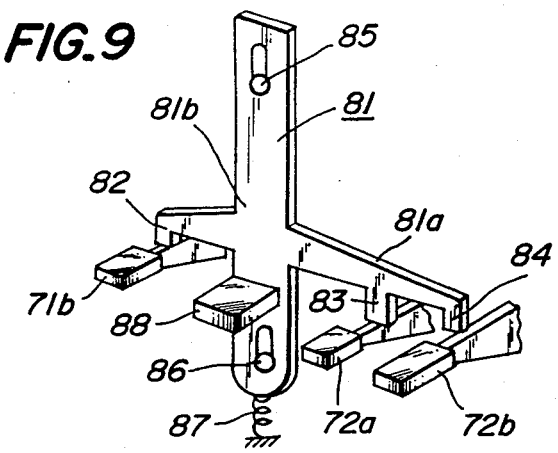
FIG. 9 is a perspective view illustrating a construction of the dubbing operation section shown in FIG. 8.

FIG. 8 shows a double cassette tape recorder in which mode change operation means is constructed of a mechanical push button switch. The construction of the tape recorder shown in FIG. 8 is the same as that of the tape recorder shown in FIG. 3 so that like reference numerals designate like or functionally equivalent parts and its explanation is omitted. In this embodiment, mode change operation devices 71 and 72 actuate at least recording and reproducing operations in cassette chambers 32 and 33 provided on the front surface of the tape recorder body of housing 31. The operation devices 71 and 72 are composed of mechanical push button switches for loading contacts by push action. This is, the operation means 71 and 72 include, in accordance with various modes shown in FIG. 8 from the left, recording operation push button switches 71a, 72a, reproducing operation push button switches 71b, 72b, stop operation push button switches 71c, 72c, rewind operation push button switches 71d, 72d, fast forward operation push button switches 71e, 72e, and pause operation push button switches 71f, 72f, which are placed in a row under the cassette chambers 32, 33. The front surface of the body 31 also carries dubbing means simultaneously interlocked with the switch 71b for the cassette chamber 32 and the switches 72a and 72b for the cassette chamber 33. As shown in FIG. 9 the dubbing means are composed of a cross-shaped actuation lever 81 capable of sliding along front panel of the tape recorder housing 31. The lever 81 has a horizontal member 81a including projections 82, 83 and 84 for actuation levers of switches 71b, 72a and 72b, respectively. The actuation lever 81 is vertically guided by guide pins 85, 86 fixed to the housing 31 and normally biased upward by a spring 87. The actuation lever 81 has also a vertical member 81b with a dubbing operation button 88 for actuating the operation lever 81. The button 88 projects from the front panel of the tape recorder housing 31.

In operation when the button 88 is depressed after the master tape is loaded in the cassette chamber 32 and the unrecorded tape is loaded in the cassette chamber 33, the operation lever 81 slides downward so that the projections 82, 83 and 84 on the horizontal member 81a are struck against actuation levers of switches 71b, 72a and 72b, respectively. When the button 88 is further depressed the actuation levers of switches 71b, 72a and 72b are pressed underward and locked so that the master tape is reproduced in response to the switch 71b and the unrecorded tape starts to record in response to the switches 72a and 72b.

Therefore, the above described construction can obtain the same effect as that shown in the previous embodiments.

Figure 10:
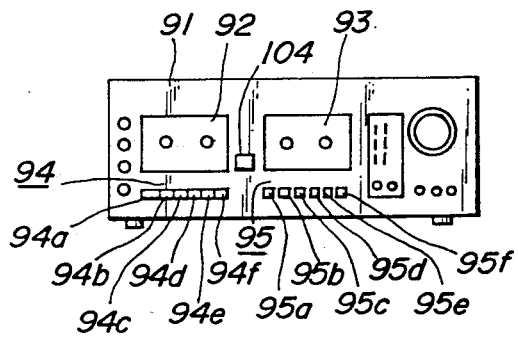
FIG. 10 is a front view showing fifth embodiment of the tape recorder according to the present invention.
Figure 11:
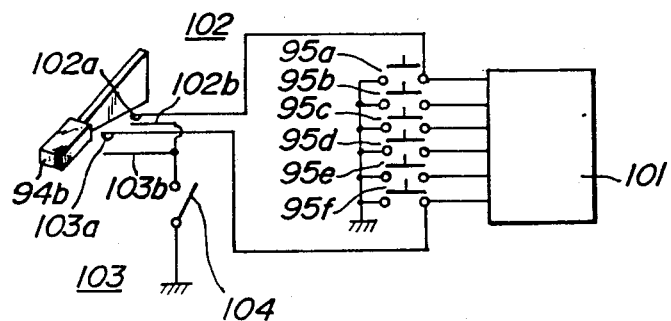
FIG. 11 is a circuit diagram illustrating the dubbing operation section shown in FIG. 10.

FIG. 10 shows a double cassette tape recorder in which the mode change operation device is constructed of a mechanical push button switch or a logic control switch. Reference numeral 91 represents a tape recorder body or housing, the front surface of which carries a C cassette loading or receiving chamber 92 and an MC cassette loading chamber 93 which form a tape drive mechanism. The front surface of the body 91 carries mode change operation means reducing 94, 95 for at least recording and reproducing operations in cassette chambers 92, 93, respectively. In this embodiment the operation device 94 of the C cassette chamber 92 is constructed of a mechanical push button switch for locking contacts by push action and the operation device 95 of the MC cassette chamber 93 it constructs of a logic control switch, for example, a feather touch switch. The mode change operation means 94, 95 include, as shown in FIG. 10 from the left side, push button switches 94a-94f or feather touch switches 95a-95f for recording, reproducing, stop, rewind, fast forward and pause operations, all of which are placed in a row. The front surface of the housing 91, moreover, carries a dubbing means or arrangement for actuating the switch 94b of the C cassette chamber 92 and the switches 95a and 95b of the MC cassette chamber 93 at one time. As shown in FIG. 11 the dubbing arrangement includes switch 95a and 95b relative to dubbing operation of feather touch switches 95a-95f which are connected to the input of an LSI 101 for controlling on OFF condition of various mode circuits, and auxiliary operation normally-off contacts 102 and 103 connected parallel to the switches 95a and 95b. The normally open contacts 102 and 103 have variable contact segments 102a and 103a provided as close as possible to the actuation lever of the switch 94b, and fixed contact segments 102b and 103b grounded through a switch 104. The switch 104 is provided on the front surface of the body 91.

In performing a dubbing operation the master tape is loaded in the C cassette chamber 92 and the unrecorded tape is loaded in the MC cassette chamber 93 and then the switch 104 is turned ON. In this condition the switch 94b is depressed so that the actuation lever of the switch 94b contacts the variable contact segments 102a, 103a of the normally open contacts 102 and 103. The depression of the actuation lever turns the normally open contacts 102 and 103 ON so that the unrecords tape starts being recorded in response to actuation of the switches 95a and 95b and the master tape starts being reproduced in response to actuation of the swith 94b.

The device thus constructed can also obtain the same effect as that of previous embodiments.

Other embodiment of the tape recorder according to the present invention will explained hereinafter.

In one embodiment, as shown in FIG. 3, the front surface of the body 31 carries an operation interlock means or arrangement for simultaneously driving the switch 34f of the cassette chamber 32 and the switch 35f of the cassette chamber 33. As shown in FIG. 4, for example, the operation interlock arrangement includes the switches 34f and 35f and auxliary pause operation feather touch switches 36'a and 36'b connected parallel thereto, which are placed as close as possible to actuate at one time. In addition to these switches an operation button 36'c is provided across the variable contact segments of the switches 36'a, 36'b resulting in formation of a pause operation interlock section 36'. The interlock section 36' has the operation button 36'c provided between the pair of cassette chambers 32 and 33. The other portions of the tape recorder are the same as that of the tape recorder shown in FIG. 3 so that an explanation of its construction is omitted.

In operation, when the operation button 36'c of interlock section 36' is depressed the switches 36'a and 36'b are simultaneously actuated by depression of the button 36'c. The control signals for controlling the power supply source for recording operation circuit and reproducing operation circuit of cassette chambers 32, 33, are supplied to LSI's 57 and 58 by the switches 36'a and 36′b, so that the ON OFF conditions of power source for the recording operation circuit and reproducing operation circuit are controlled by these control signals through LSI's 57 and 58.

In this condition, for example, when the dubbing operation is performed by actuation of the switches 34b, 35a and 35b after the master tape is loaded in the cassette chamber 32 and the unrecorded tape is loaded in the cassette chamber 33, control signals for turning ON the reproducing operation circuit of the cassette chamber 32 and the recording operation circuit of the cassette chamber 33 are stored in the LSI's 57 and 58 through the switches 35a and 35b so that the reproducing operation circuit of the chamber 32 and the recording operation circuit of the chamber 33 are in an operation stand-by condition.

When the operation button 36′c of the interlock section 36′ is depressed, then the switches 36′a and 36′c so that control signals for turning ON the power source for the recording operation circuit and reproducing circuit of the chambers 32, 33 are supplied to the LSI's 57 and 58 through the switches 36′a and 36′b thereby reproducing from the master tape and recording on the unrecorded tape simultaneously.

After actuation of the interlock section 36′ turns OFF the power source of the recording operation circuit and the reproducing operation circuit of the chambers 32 and 33, thereby placing both cassette chambers 32, 33 into recording operation stand-by condition by actuation of switches 34a, 35a, the interlock section 36′ is actuated so that control signals for turning ON the power source of each recording operation circuit are supplied to LSI's 57 and 58 simultaneously through the switches 36′a and 36′b. These control signals drive each recording operation circuit, simultaneously, through LSI's 57 and 58 so that unrecorded tapes loaded in both cassette chambers 32 and 33 are also recorded simultaneously. In this case the reproducing operation is performed instead of the recording operation so that simultaneous reproducing can be carried out.

When the switches 34f and 35f of the operation mechanisms 34 and 35 are actuated without actuating the interlock section 36′ the tape recorder can be used conventionally.

Therefore, the switches 34f and 35f for ON-OFF control of the power source for the recording operation circuit and the reproducing operation circuit of the cassette chambers 32 and 33 are connected parallel to the switches 36′a and 36′b respectively and a pair of the switches 36′a and 36′b are positioned as close as possible to the button 36′c so as to drive them at one time so that the dubbing operation, the simultaneous recording and the simultaneous reproducing can easily be carried out.

According to the present invention the power source for the recording operation circuit and the reproducing circuit of the cassette chambers 32, 33 can be turned ON and OFF simultaneously only by actuation of the button 36′c so that cassette tapes loaded in both cassette chambers 32, 33 can simultaneously be run, resulting in a prevention of unrecorded initial portion and interrupted last portion of dubbing.

A further embodiment of a tape recorder according to the present invention follows.

Figure 12:
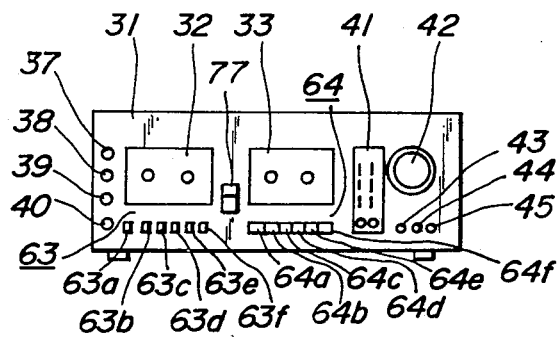
FIG. 12 is a front view showing seventh embodiment of tape recorder according to the present invention.

FIG. 12 shows a double cassette tape recorder in which the mode change operation means is constructed of a mechanical push button switch.

Figure 13:
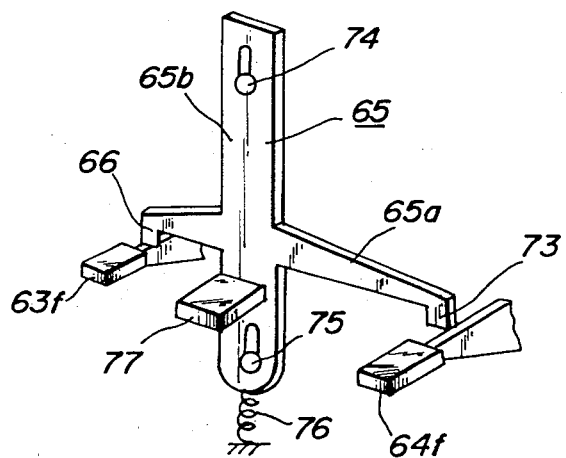
FIG. 13 is a perspective view illustrating a construction of an operation interlock means shown in FIG. 12.

The construction of the tape recorder shown in FIG. 12 is the same as that of the tape recorder shown in FIG. 3 so that like reference numerals designate like or functionaly equivalent parts. In this embodiment, mode change operation means or arrangements 63 and 64 change the operation of various modes in cassette chambers 32 and 33 provided on the front surface of the tape recorder housing 31. The operation means or arrangements 63 and 64 include a mechanical push button switch for locking the contacts by push action. That is, the operation arrangements 63 and 64 include, in accordance with various modes as shown in FIG. 12 from the left side thereof, recording operation push button switches 63a, 64a, reproducing operation push button switches 63b, 64b, stop operation push button switches 63c, 64c, rewind operation push button switches 63d, 64d, fast forward operation push button switches 63e, 64e, and pause operation push button switches 63f, 64f, which are placed in a row under the cassette chambers 32, 33. On the front surface of the body 31 there is also arranged operation interlock means or devices simultaneously interlocked with the switch 63f for the cassette chamber 32 and the switch 64f for the cassette chamber 33. As shown in FIG. 13 the operation interlock device includes comprises a cross-shaped actuation lever 65 capable of sliding along the front panel of the tape recorder housing 31. The lever 65 has a horizontal member 65a having projections 66 and 73 at actuation levers of switches 63f, 64f, respectively. The actuation lever 65 is vertically guided by guide pins 74, 75 fixed to the housing 31 and normally biased upward by a spring 76. The actuation lever 65 has also a vertical member 65b provided therewith a pause operation button 77 for actuating the actuation lever 65. The button 77 projects from the panel of the tape recorder body 31.

In operation, when the button 77 is depressed, the operation lever 65 slides downward so that projections 66 and 73 provided on the horizontal member 65a strike against the actuation levers of switches 63f, 64f, respectively. When the button 77 is depressed further the actuation levers of swithes 63f and 64f are pressed down and liked so that the power source of recording and reproducing operation circuits is turned OFF by actuation of the switch 63f.

Therefore, the above described construction can produce the same effect as that shown in the previous embodiments.

Figure 14:
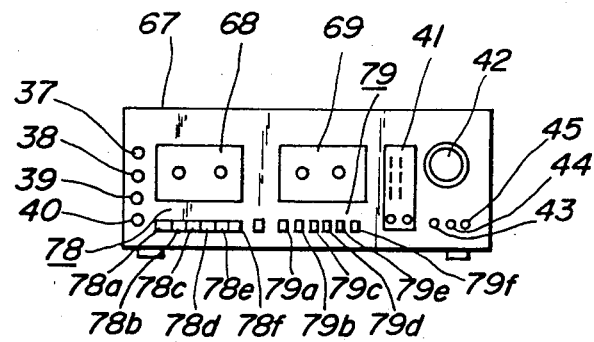
FIG. 14 is a front view showing eighth embodiment of the tape recorder according to the present invention.
Figure 15:
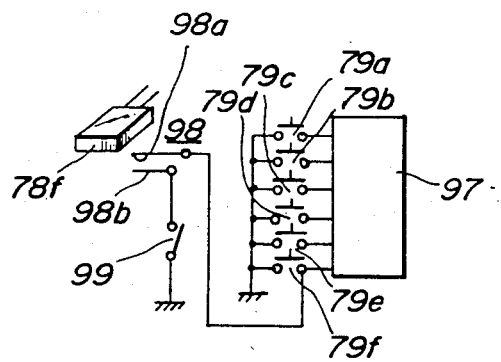
FIG. 15 is a circuit diagram explaining the operation interlock means shown in FIG. 14.

FIG. 14 shows a double cassette tape recorder in which the mode change operation means or arrangement is constructed of a mechanical push button switch or a logic control switch. Reference numeral 67 is a tape recorder body or housing, the front surface of which has a C cassette loading or receiving chamber 68 and an MC cassette loading chamber 69, which form a tape drive mechanism. The front surface of the housing 67 carries mode change operation means or arrangements 78, 79 for changing various modes with reference to cassette chambers 68, 69, respectively. In this embodiment the operation arrangement 78 of the C cassette chamber 68 is constructed of a mechanical push button switch for locking contacts by push action and the operation means 79 of the MC cassette chamber 69 is constructed of a logic control switch, for example, a feather touch switch. The mode change operation arrangements 78, 79 include, as shown in FIG. 14 from the left, push button switches 78a–78f or feather touch switches 79a–79f for recording, reproducing, stop, rewind, fast forward and pause operations, which are placed in a row. The front surface of the housing 67, moreover, carries an operation interlock means or arrangements for actuating the switch 87f of the C cassette chamber 68 and the switch 79f of the MC cassette chamber 69 at one time. As shown in FIG. 15 the operation interlock arrangement includes switch 79f relative to the pause operation of feather touch switches 79a–79f which are connected to input of an LSI 97 for controlling the ON-OFF condition of various mode circuits, and auxiliary operation normally-off contact 98 connected parallel to the switch 79f. The normally open contact 98 has a movable contact segment as close as possible to the actuation lever of the switch 78f, and a fixed contact segment 98b grounded through a switch 99. The switch 99 is provided on the front surface of the housing 67.

For performing an interlocking operation in the ON state of the switch 99 the switch 78f is depressed so that the actuation lever of the switch 78f contact the movable contact segment 98a of the normally open contact. The depression of the actuation lever turns the normally open contacts 98 and 79f ON simultaneously.

The device thus constructed can also obtain the same effect as that of previous embodiment.

What is claimed is:

1. A tape recorder comprising a tape recorder housing, a pair of tape drive mechanisms in the housing, first reproducing operation means for effecting reproduction with one tape drive mechanism, recording operation means for effecting recording in the other tape drive mechanism, second reproducing operation means for effecting reproduction with the other tape drive mechanism; mode change means coupled to each of the tape drive mechanisms and each of said operation means for effecting recording or reproducing operations with at least one of said mechanisms and one of said operation means; and dubbing means coupled to said mode change means for simultaneously actuating said first reproducing operation means and said one tape drive mechanism as well as the recording operation means and the second reproducing operation means along with the other tape drive mechanism; said dubbing means includes manually operable members coupled to the first and second reproducing operation means and said recording means, and close enough to each other to actuate said first and second reproducing operation means and said recording means simultaneously with a single manual push.

2. A tape recorder as claimed in claim 1, wherein the mode change operation means comprises a logic control switch.

3. A tape recorder as claimed in claim 1, wherein the mode change operation means comprises a mechanical push button switch.

4. A tape recorder as claimed in claim 1, wherein said dubbing means comprises a first logic control switch for actuating said reproducing operation means for the one tape drive mechanism and a second logic control switch for actuating the recording operation means of the other tape drive mechanism, and a third logic control switch for actuating said reproducing operation means of the other tape drive mechanism, said switches being positioned so that they are capable of operating at one time.

5. A tape recorder as claimed in claim 1, wherein the mode change operation means comprises a logic control switch.

6. A tape recorder as claimed in claim 5, wherein the operation interlock means is positioned close enough to the pause operation means so as to drive the pair of pause operation means at one time.

7. A tape recorder comprising a tape recorder housing, a pair of tape drive mechanisms in the housing, first reproducing operation means for effecting reproduction with one tape drive mechanism, recording operation means for effecting recording in the other tape drive mechanism, second reproducing operation means for effecting reproduction with the other tape drive mechanism; mode change means coupled to each of the tape drive mechanisms and each of said operation means for effecting recording or reproducing operations with at least one of said mechanisms and one of said operation means; and dubbing means coupled to said mode change means for simultaneously actuating said first reproducing operation means and said one tape drive mechanism as well as the recording operation means and the second reproducing operation means along with the other tape drive mechanism;

said mode operation means including a logic control switch;

said dubbing means including a first logic control switch for actuating said reproducing operation means for the one tape drive mechanism and a second logic control switch for actuating the recording operation means of the other tape drive mechanism, and a third logic control switch for actuating said reproducing operation means of the other tape drive mechanism, said switches being positioned so that they are capable of operating at one time.

8. A tape recorder as claimed in claim 1, wherein the dubbing means further includes a remote control device for controlling ON and OFF operations of the first and the second logic control switches.

9. A tape recorder as claimed in claim 7 or 3, wherein the dubbing means further comprises an actuation lever and a first push button interlocked with the lever for actuating the reproducing operation means of the one tape drive mechanism, and a second push button interlocked with the lever for actuating said recording operation means and said second reproducing operation of the other tape drive mechanism simultaneously.

10. A tape recorder comprising a tape recorder housing, a pair of tape drive mechanisms in the housing, mode change operation means on each of the tape drive mechanisms for actuating at least recording or reproducing operations in each mechanism, a pair of pause operation means for temporarily turning off the recording or reproducing operation caused by the mode change operation means, and an operation interlock means for simultaneously operating the pair of pause operation means; each of said change operation means comprising a logic control switch, the operation interlock means being positioned close enough to the pause operation means so as to drive the pair of pause operation means at one time.

11. A tape recorder as claimed in claim 10, wherein the operation interlock means comprises operation buttons for simultaneously operating the pair of pause operation means.

12. A tape recorder as claimed in claim 10, wherein the mode change operation means comprises a mechanical push button switch.

13. A device as in any of claims 10 and 12, wherein said interlock means is arranged to actuate said pause operation means with a single mechanical push.

14. A tape recorder as claimed in any one of claims 10 to 12, wherein the operation interlock means comprises an actuation lever for driving the pause operation means of one tape drive mechanism and the pause operation means of the other tape drive mechanism.

* * * * *